Patented Oct. 26, 1954

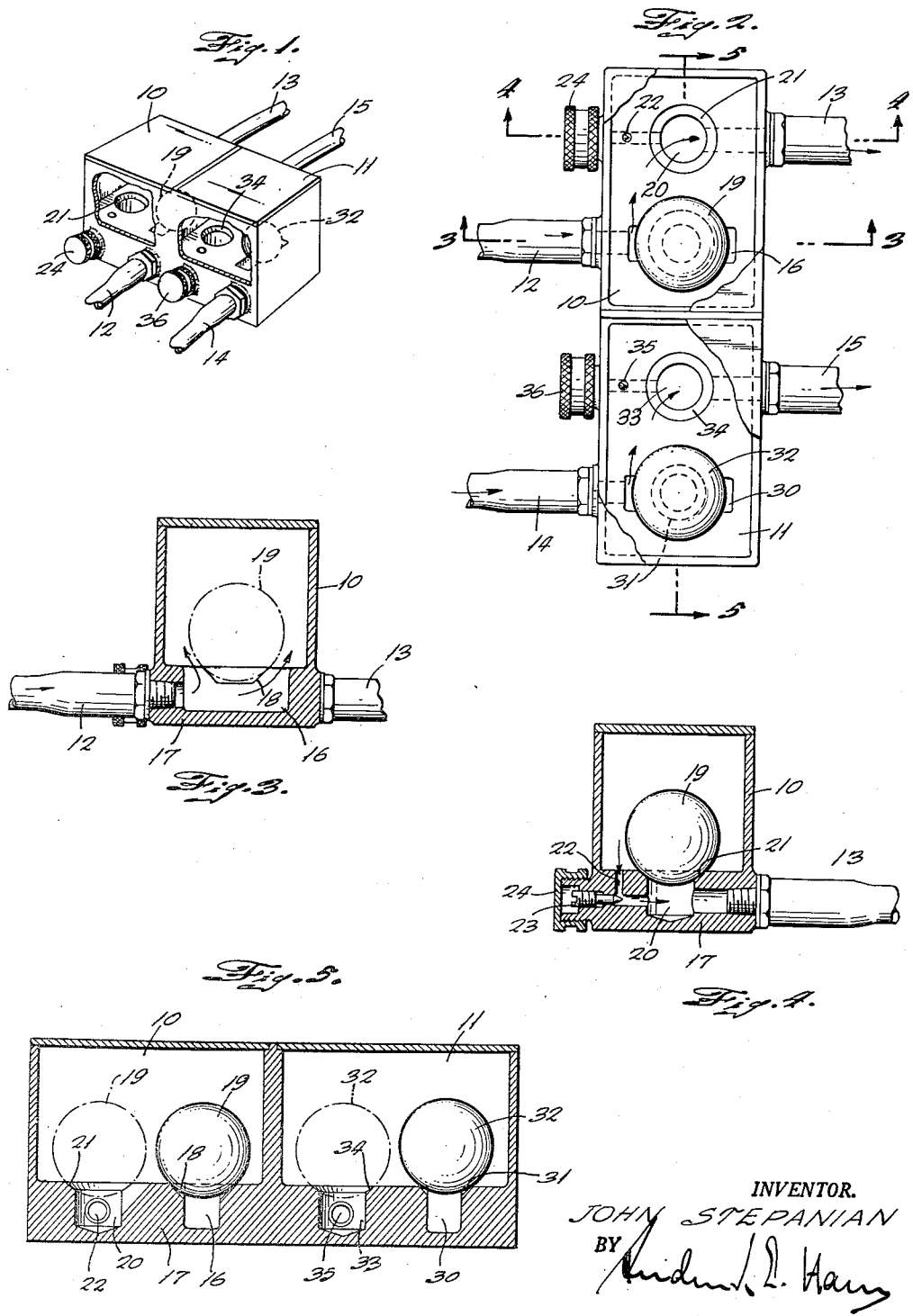

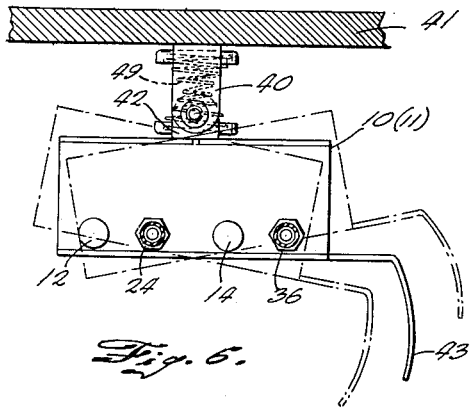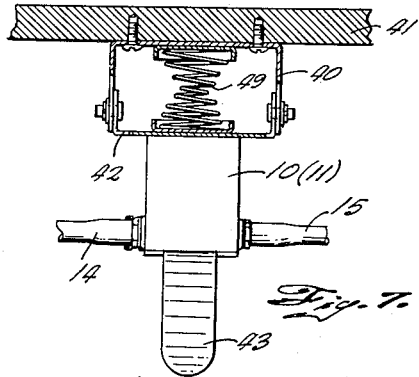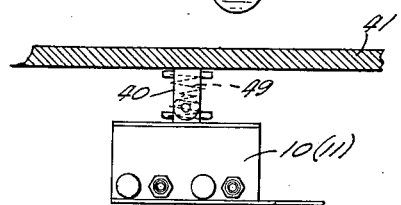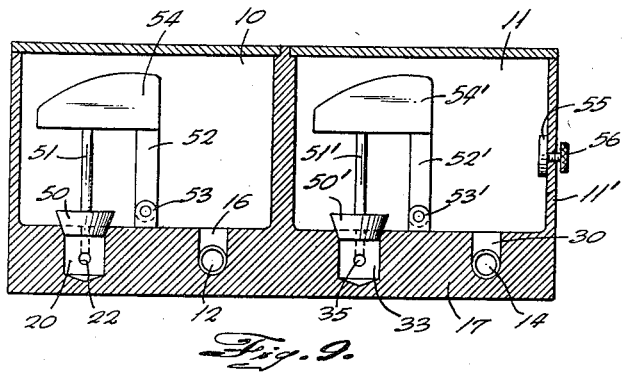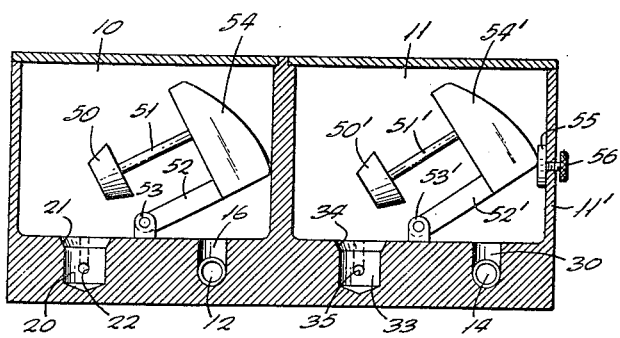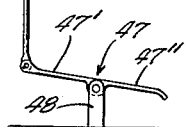

2,692,606

UNITED STATES PATENT OFFICE 2,692,606

SAFETY AND CONTROL DEVICE FOR GASEOUS MEDIA

John Stepanian, West New York, N. J.

Application January 19, 1951, Serial No. 206,873

9 Claims. (Cl. 137—38)

This invention relates to safety and control devices for the control of the rate of one or more gaseous media, more particularly the invention relates to safety and control devices for control of the flow of air or oxygen and gas used for burners and torches of various types.

One of the objects of the present invention is to provide a control device of the general type, above referred to, the movable control members of which are disposed within a completely sealed receptacle and can be operated from the outside of the receptacle without any direct mechanical communication between control members within the receptacle and outside of the receptacle, thereby avoiding any danger of leakage of the gaseous medium or media.

Another more specific object of the invention is to provide a control device permitting the use of a completely closed receptacle all the walls of which are substantially rigid, thereby avoiding the necessity of employing a delicate component such as a diaphragm.

Another object of the invention is to provide a novel and improved control device which is controlled by moving the said closed receptacle itself and which is so mounted that the necessary movement of the receptacle can be effected by various parts of the body of an operator, thereby leaving the hands of the operator free to hold and handle the work piece at which he is working.

Still another object of the invention, allied with the preceding ones, is to combine several safety and control valves for controlling the flow of different gaseous media such as gas and air.

Another more specific object of the invention is to provide means by which the flow of the different gaseous media is controlled with a predetermined time relationship. If for instance a dual control device serves to control the flow of air and gas to a burner, it is important, or at least advantageous that the flow of air be reduced prior to the reduction of the flow of gas since otherwise the full flow of air may extinguish a pilot flame fed by the reduced flow of gas.

Another more specific object of the invention is to provide a dual control device which permits restoration of the relationship between the flow of gas and air or oxygen which prevailed prior to a reduction of the flow rate of both media. This is particularly useful for devices such as blow torches and welding torches as it does away with the necessity of a readjustment of the flow of the two media each time the use of these devices is temporarily discontinued.

Other and further objects, features and additions to the invention will be pointed out hereinafter and set forth in the appended claims forming part of the application.

In the accompanying drawing several now preferred embodiments of the invention are shown by way of illustration and not by way of limitation.

In the drawing:

Fig. 1 is a perspective view of a dual control device according to the invention.

Fig. 2 is a plan view of Fig. 1 on an enlarged scale.

Fig. 3 is a section taken on line 3—3 of Fig. 2.

Fig. 4 is a section taken on line 4—4 of Fig. 2.

Fig. 5 is a section taken on line 5—5 of Fig. 2.

Fig. 6 is an elevational side view of the control device according to Fig. 1 showing support means for the device.

Fig. 7 is a right side front view of Fig. 6.

Fig. 8 is an elevational side view of a modification of the support means for the control device according to Fig. 1.

Fig. 9 is a sectional side view of a modification of a dual control device according to the invention, and Fig. 10 shows the inner control members of the device in different positions.

Referring first to Figures 1 to 5 in detail, these figures show a dual control valve for controlling the rate of flow of two gaseous media, for instance, gas and air fed to a gas burner. The gas burner itself which may or may not be of conventional design, is not essential for the understanding of the invention and, therefore, not shown or described in detail.

The control device according to Figures 1 to 5 comprises two sealed receptacles 10 and 11 respectively of which receptacle 10 may serve for the control of gas and receptacle 11 for the control of air. The receptacles may be made of any suitable material such as metal.

Gas is admitted into receptacle 10 through a conduit 12 and discharged therefrom through a conduit 13. Similarly, air is admitted into receptacle 11 through a conduit 14 and discharged therefrom through a conduit 15. However, it should be understood that the gaseous media can also be admitted through conduits 13 and 15 respectively, and discharged from receptacles through conduits 12 and 14 respectively.

Conduit 12 communicates with an elongated recess 16 in the reinforced bottom 17 of the receptacle. This recess is widened to form a seat 18 for a closure member 19 shown as a ball made, for instance, of metal.

As can best be seen on Fig. 2 the length of the recess 16 is so selected that gas will be admitted into receptacle 10 through conduit 12 even though ball 19 is seated upon its seat 18. The bottom 17 of the receptacle is provided with a second recess 20 communicating with the discharge conduit 13 and also forming a seat 21 for ball 19. Recess 20 also communicates with a narrow by-pass channel 22 leading into receptacle 10. The cross-section of by-pass 22 can be regulated by means of a set screw 23. To prevent any leakage of gas along the bore for set screw 23 a screw cap 24, preferably filled with sealing material such as paraffin, may be provided.

As can best be seen on Fig. 4, the recess 20 is completely covered when ball 19 is seated upon the same, thereby leaving only the by-pass 22 open for the discharge of gas through conduit 13.

It will now be apparent that gas will flow at full rate through receptacle 10 when ball 19 is seated upon its seat 18 and that the flow of gas is reduced to a low rate when ball 19 is seated upon its seat 21. This reduced flow of gas is so selected that it is just sufficient to maintain the pilot flame of the burner.

The size of ball 19 in relation to the size of receptacle 10 is preferably so selected that ball 19 is compelled to assume a position either on seat 18 or 21. In other words, ball 19 is compelled to occupy either one of two positions.

Receptacle 11 is similar to receptacle 10 in that an elongated slot 30 communicates with inlet conduit 14 and is widened to form a seat 31 for a second closure member 32 also shown as a ball. The discharge conduit 15 communicates with a second recess 33 in bottom 17 and is also widened to form a seat 34 for ball 32. Recess 33 also communicates with a by-pass 35 which can be regulated by a set screw similar to set screw 23 and may be covered by a cap 36.

Again it will be apparent that air can flow at full rate through receptacle 11 when ball 32 is seated upon its seat 31 and that the air flow will be reduced to a low rate when ball 32 is seated upon seat 34. In this connection it should be mentioned that the by-pass 35 and the elements associated therewith can be omitted for receptacle 11 since this receptacle serves to control the flow of air only.

For the purpose of moving balls 19 and 32 from one position into the other, both the receptacles are tilted or otherwise moved from the outside. It will be evident that any tilting movement will cause both the balls to roll from whatever position they may occupy into the other position.

As was previously explained, it is essential that the flow of air is reduced shortly prior to the flow of gas since otherwise the full flow of air may extinguish the small pilot flame. To provide such time interval between the flow of gas and air, time delaying or retaining means are associated with receptacles 10 and 11. These delaying and retaining means are shown in the embodiment of the invention according to Figures 1 to 5 as valve seats 18 and 31 of different depth. As can best be seen on Fig. 5, seat 31 is shallower than seat 18. Consequently, ball 32 will leave its seat 31 prior to ball 19 leaving its seat 18 in response to a given equal tilting of both the receptacles. Hence, ball 32 will reach its closing position somewhat earlier than ball 19, thereby reducing the flow of air prior to the flow of gas.

The two receptacles are shown as being structurally integrated. While such design is generally simpler from a manufacturing viewpoint, it should be understood that it is also feasible to provide two separate receptacles which are joined by a bracket or other suitable means. The two receptacles can also be entirely separate. It is only essential for the invention that both the receptacles can be simultaneously tilted or otherwise moved.

For the purpose of moving both receptacles in a convenient manner, the two receptacles are tiltably supported, preferably so that they can be tilted by a suitable portion of the body of the operator, thereby leaving the hands of the operator free to hold and handle the work piece at which he is working.

Figures 6 and 7 show suspension means for the receptacles which permit moving of the receptacles, for instance, by arm or leg operation.

According to Figures 6 and 7 a U-shaped bracket 40 is secured to a work bench 41 and supports a pivotal bracket 42 to which the receptacles proper are secured. The handle or arm 43, which may have any suitable shape, is fastened to the receptacles. It should be visualized as being disposed in such position that a workman sitting or standing in front of his work bench can easily give the arm a push or pull with his leg or arm so that the balls roll from one position into the other in accordance with the requirements of the work in progress.

Fig. 8 illustrates a design permitting tilting of the receptacles by foot operation. For this purpose, a link 45 is pivoted at one end to an arm 46 secured to the receptacles. The other end of the link 45 is pivoted to a foot pedal 47 pivotally supported at an intermediate point by a suitable frame 48.

As will be apparent, pressure exerted upon arm 47' of pedal 47 will cause tilting of the receptacles in one direction and upon arm 47" in the opposite direction, thereby permitting movement of the balls from one position into the other.

For the purpose of biasing the receptacles always into a horizontal position, unless tilting pressure is exerted upon the same, suitable balancing means such as a double cone spring 49 may be provided.

Figs. 9 and 10 show a dual valve control device based upon the same principle as the device according to Figs. 1 to 5 but employing swinging closure members rather than freely movable ones. The same reference characters designate the same components of the device.

The closure member of the gas controlling receptacle 10 is shown as a valve cone 50 adapted to be seated upon seat 21, thereby cutting off the flow of gas through receptacle 10 except for the reduced flow through by-pass 22. Valve cone 50 is supported by rod 51 which, in turn, is secured to a lever or link 52 pivoted at 53 to the bottom 17 of the receptacle. Lever 52 is weighted by a weight 54 for causing the valve cone 50 to assume either the position shown on Fig. 9 which is the closing position of the valve or the position shown on Fig. 10 which is the open position of the valve.

The control members within receptacle 11 are arranged in similar manner, as is indicated by using the same reference characters, though primed.

As will be obvious, shaking, tilting, or otherwise moving receptacles 10 and 11 will move the two valve cones 50 and 50' either into the position according to Fig. 9 or into the position according to Fig. 10.

For the purpose of providing the desired time interval between the closing of the gas and the air, an abutment member 55 is secured to wall 11' of receptacle 11. As will be apparent, this abutment member shortens somewhat the distance cone 50' has to travel so that this cone reaches its closing position slightly before cone 50. The abutment member is shown as a plate, the position of which can be adjusted by means of a set screw 56. Of course, various other means can also be provided to vary the closing time of cone 50' relative to the closing time of cone 50.

The two receptacles 10 and 11 can again be integrated or be separately designed. The necessary tilting movements of the receptacles can be accomplished by providing suitable support means such as are described in connection with Figs. 6, 7, and 8.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

I claim:

1. A control device for controlling the flow of two gaseous media, comprising in combination first valve means including a sealed receptacle having an inlet opening for one of said media to be controlled and an outlet opening for the said medium, and a closure member movably disposed within the receptacle and capable of assuming either a position closing one of said openings or leaving both said openings uncovered; second valve means including a sealed receptacle having an inlet opening for the other medium to be controlled and an outlet opening for the said other medium, and a closure member movably disposed within the receptacle of the second valve means and capable of assuming either a position closing one of the openings in said latter receptacle or leaving both said openings uncovered, one of said receptacles having a by-pass through one of its walls by-passing the opening adapted to be closed by the respective closure member for maintaining a minimal flow of the respective gaseous medium through the said receptacle when the respective opening is closed by the closure member, each of the said closure members being arranged to move from one position into the other in response to a movement of the respective receptacle; actuating means operatively coupled with both said receptacles for imparting to the said receptacles a joint movement causing the closure members therein to move from one position into the other; and guide and retaining means in each receptacle for removably guiding into and retaining the respective closure member in either of the two positions, the guide and retaining means in one of the receptacles being arranged to delay movement of the respective closure member into the position covering the respective opening relative to the other closure member in response to a joint manipulation of both the receptacles from the outside for moving both the closure members into the position closing the respective openings.

2. A control device as defined in claim 1, wherein common support means support both the receptacles, the said support means being tiltably mounted for joint movement of the receptacles.

3. A control device as defined in claim 2, wherein operating means are secured to the said support means for imparting a tilting movement to both the receptacles in response to pressure applied by an operator to said operating means.

4. A control device as defined in claim 3, wherein said support means comprise a hingedly supported common base bracket for the two receptacles, and wherein said operating means comprise an arm extending from said base in a position engageable by the body of the operator.

5. A control device for controlling the flow of two gaseous media, comprising in combination first valve means including a sealed receptacle having an inlet opening for one of said media to be controlled and an outlet opening for the said medium, and a closure member movably disposed within the receptacle and capable of assuming either a position closing one of said openings or leaving both said openings uncovered; second valve means including a sealed receptacle having an inlet opening for the other medium to be controlled and an outlet opening for the said other medium, and a closure member movably disposed within the receptacle of the second valve means and capable of assuming either a position closing one of the openings in said latter receptacle or leaving both the said openings uncovered, one of said receptacles having a by-pass through one of its walls by-passing the opening adapted to be closed by the respective closure member for maintaining a minimal flow of the respective gaseous medium through the said receptacle when one of the openings thereof is closed by the respective closure member; and guide and retaining means in each receptacle for removably guiding into and retaining the respective closure member in either of the two positions, the guide and retaining means in one of the receptacles being arranged to delay movement of the respective closure member into the position covering the respective opening relative to the other closure member in response to a joint manipulation of both the receptacles from the outside for moving both the closure members into the position closing the respective openings.

6. A control device as defined in claim 5, wherein the said guide and retaining means of each receptacle comprise two spaced depressions in the bottom wall of the receptacles, each depression forming a seat for the respective closure member, one of the seats in each receptacle communicating with the opening of the respective receptacle adapted to be closed by the respective closure member when seated upon the same and by-passed by said by-pass, the other seats of the receptacles being of different relative depth, the deeper seat retaining the respective closure member relative to the other closure member in response to a joint manipulation of both receptacles.

7. A control device as defined in claim 5, wherein the said guide and retaining means within each receptacle comprise a movably supported means for the respective closure member arranged to move the said closure members either into a position closing one of said openings or into a position removed from the said closing position in response to a joint manipulation of said closure members, the distance which the support means of the two receptacles have to move the closure members from the removed position into the closing position being different, thereby causing one closure member to reach its closing position prior to the other closure member.

8. A control device as defined in claim 5, for controlling the flow of a combustible gaseous medium and of a combustion entertaining gaseous medium, one of said valve means controlling the flow of the combustible gaseous medium and the other valve means controlling the flow of the combustion entertaining gaseous medium, and wherein the movement of the closure member of the valve means controlling the combustion entertaining gaseous medium into its covering position is delayed relative to the movement into the said position of the closure member of the other valve means.

9. A control device as defined in claim 1, wherein common support means support both the receptacles, the said support means being tiltably mounted for joint movement of the receptacles, and wherein operating means are secured to said support means for imparting a tilting movement to both the receptacles, the said operating means including a bracket extending from said support means and a foot treadle operatively linked to said bracket.

References Cited in the file of this patent

UNITED STATES PATENTS

| Number | Name | Date |
|---|---|---|
| 1,457,599 | Pace | June 5, 1923 |
| 2,043,982 | Bruneau | June 16, 1936 |
| 2,056,322 | Hoppe | Oct. 6, 1936 |
| 2,151,278 | Milhaupt | Mar. 21, 1939 |
| 2,405,127 | Beach | Aug. 6, 1946 |